United States Patent [19]

Hayashi

[11] 4,090,679
[45] May 23, 1978

[54] TAPE TENSION IMPARTING APPARATUS

[75] Inventor: Kiyoshi Hayashi, Nagoya, Japan

[73] Assignee: Shin-Shirasuna Electric Corp., Nagoya, Japan

[21] Appl. No.: 766,622

[22] Filed: Feb. 7, 1977

[30] Foreign Application Priority Data

Feb. 20, 1976 Japan .................. 51-17726

[51] Int. Cl.² .............. G11B 15/46; G11B 15/54
[52] U.S. Cl. .................. 242/186; 242/191; 318/6; 318/315
[58] Field of Search .......... 242/191, 186, 75.51; 318/6, 7, 310, 317, 318, 315, 327

[56] References Cited
PUBLICATIONS

*Tape Speed Control Method*, A. C. Thorpe — I.B.M. Technical Disclosure Bulletin, vol. 15, No. 8, pp. 2603–2605, Jan. 1973.

*Primary Examiner*—George F. Mautz

[57] ABSTRACT

A method of imparting a predetermined tension to a tape transported at a predetermined velocity from one to the other of the reels mounted on a pair of reel spindles at least one of which is rotated by a motor to have a rotational torque imparted thereto, wherein detection is made of the number of revolutions of the reel spindle rotated by the motor, a signal resulting from said detection is frequency-voltage converted, then the thus converted signal is converted into a logarithmic signal, subsequently the logarithmic signal is subtracted from a reference voltage, and a signal resulting from the subtraction is supplied to the motor to thereby impart a predetermined tension to the tape.

3 Claims, 1 Drawing Figure

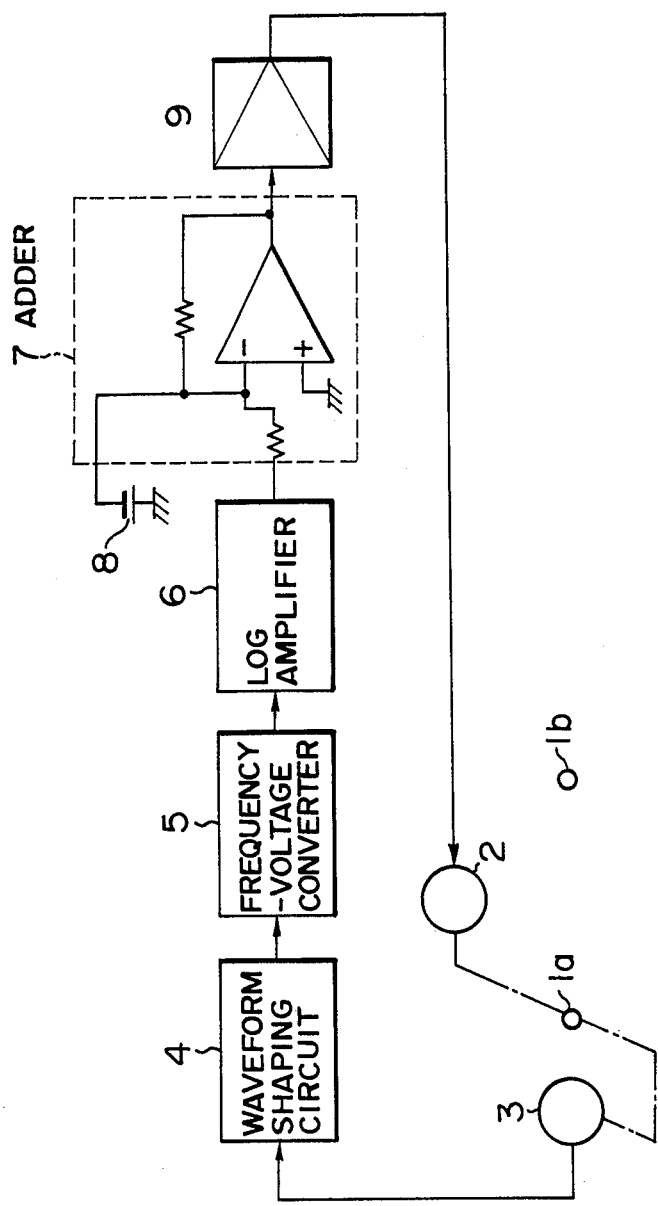

TAPE TENSION IMPARTING APPARATUS

BACKGROUND OF THE INVENTION

1. Field of the Invention

This invention relates to a method of imparting a predetermined tension to a tape-like member transported at a predetermined velocity as in tape recorders.

2. Description of the Prior Art

Heretofore, in a tape recorder, the tape transported by a capstan has been taken up from one reel onto another in such a manner that a rotational torque is imparted to the reel spindle on the take-up side to prevent occurrence of slack in the tape while a tension is imparted to the tape to cause the tape to frictionally engage a head with a suitable contact pressure and a brake torque is imparted to the reel spindle on the supply side to stabilize the transport of the tape.

Usually, however, the rotational torque and brake torque so imparted to the take-up reel spindle and the supply reel spindle are constant but the tension imparted to the tape is greatly variable by the amount of the tape wound on the reel mounted on each of the reel spindles. Let the tape tension be $T_e$, the torque of the reel spindle be $T_t$ and the radius of the coiled tape on the reel be $r$. These are in the following relation:

$$T_e = T_t/r \tag{1}$$

For this reason, there has been proposed a method of directly detecting the tension in the tape and controlling to impart to the reel spindle such a torque that the tension in the tape becomes constant. However, such method is disadvantageous in that high mechanical accuracy is required and that in the case where the tape is contained in a cassette for example, difficulties are experienced in designing since the space available to detect the tension is limited.

SUMMARY OF THE INVENTION

It is an object of this invention to provide a novel method comprising the steps of detecting the number of revolutions of a reel spindle, instead of directly detecting the tension in the tape as in the prior art, and controlling the torque of the reel spindle on the basis of the result of the detection to thereby maintain the tape tension constant, thus solving all the problems peculiar to the prior art.

Before an embodiment of the present invention is disclosed, description will first be made of the concept underlying the invention. Let the number of revolutions of the reel spindle be $n$, the tape velocity be $v$ and the radius of the wound tape be $r$. Then, the following relation holds true:

$$n = v/2\pi r \tag{2}$$

From this equation and the previously shown equation (1), there is obtained the following relation:

$$T_t = vT_e/2\pi n \tag{3}$$

From this equation, it is seen that the reel spindle torque $T_t$ for making the tape tension $T_e$ constant and the number of revolutions $n$ of the reel spindle are in inversely proportional relation with each other, but great complexity will be involved in the circuit arrangement for providing a signal which will satisfy such inversely proportional relation after the signal representing the number of revolutions $n$ has been taken out. The inventor has variously studied how to obtain a signal which will substantially satisfy the desired relation between the reel spindle torque $T_t$ and the number of revolutions $n$ of the reel spindle, without resorting to such a complex circuit arrangement, and as the result, the inventor has hit upon the adoption of a circuit arrangment which is capable of providing a logarithmic signal in which the reel spindle torque $T_t$ is in proportional relation with the logarithm of the reciprocal of the number of revolutions $n$ of the reel spindle and in which a signal obtained by subtracting the logarithmic signal from a certain reference signal substantially corresponds to the signal satisfying the above-described inversely proportional relation and which can establish the following relation between the reel spindle torque $T_t$ and the number of revolutions $n$ of the reel spindle, whereby the inventor has ascertained that a sufficiently satisfactory result may be obtained by that circuit arrangement.

$$T_t \propto A - B(\log n - C) \tag{4}$$

where A, B and C are constants.

Such a relation can readily be realized by the use of an amplifier having a logarithmic characteristic.

Other objects, features and advantages of this invention will become apparent from the following description taken in conjunction with the accompanying drawing.

BRIEF DESCRIPTION OF THE DRAWING

The drawing is a schematic block diagram showing an example of the circuit arrangement which can carry out the method of the present invention.

DESCRIPTION OF THE PREFERRED EMBODIMENT

An embodiment of the present invention will hereinafter be described by reference to the accompanying drawing. Designated by 1a and 1b are a pair of reel spindles on which respective reels (not shown) may be mounted. These reel spindles may be designed such that one or both of them are rotatable by a motor so that a rotational torque may be imparted thereto, but in the shown embodiment the reel spindle 1a is designed to be rotatable by a motor 2, for the sake of convenience. Also, as in the conventional tape recorder, a tape (not shown) may be transported at a predetermined velocity from one of the reels (not shown) mounted on the reel spindles to the other reel. Detector means 3 such as a frequency generator adapted to detect the number of revolutions of the reel spindle 1a is associated with that reel spindle. This detector means 3 may be connected through a suitable waveform shaping circuit 4 to a frequency-voltage conversion circuit 5, as required, and the conversion circuit 5 is connected to a logarithmic amplifier circuit 6. Designated by 7 is an adder circuit whose operational amplifier has its negative terminal connected to the output of the logarithmic amplifier circuit 6 and to a reference voltage source 8 having its positive terminal grounded and supplying a reference voltage. The output of the adder circuit 7 is supplied through an amplifier circuit 9 to the motor 2. It is to be noted that the constants A, B and C in the aforementioned equation (4) respectively correspond to the reference voltage supplied by the reference voltage source 8, the gain of the logarithmic amplifier circuit 6 and the offset of the frequency-voltage conversion circuit 5.

With the above-described circuit arrangement, the number of revolutions $n$ of the reel spindle 1a is detected by the detector means 3 and taken out as a frequency signal, which is suitably waveform-shaped by the waveform shaping circuit 4, whereafter the signal is applied to the frequency-voltage conversion circuit 5, in which the signal is converted into a DC voltage having a level proportional to the frequency of the signal. Subsequently, the output of the conversion circuit 5 is logarithmically amplified by the logarithmic amplifier circuit 6 and applied to the adder circuit 7. Thus, at the output side of the adder circuit 7, there is provided a signal corresponding to the difference between said reference voltage and the output of the logarithmic amplifier circuit 6, and this signal is just a signal substantially corresponding to the signal which satisfies the aforementioned inversely proportional relation, namely, which satisfies equation (4). The signal so provided is amplified by the amplifier circuit 9 and supplied to the motor 2, whereby a predetermined tension is imparted to the tape.

According to the present invention, as will be appreciated, the torque of the reel spindle is controlled in accordance with a signal provided by detecting the number of revolutions of the reel spindle, instead of directly detecting the tape tension as in the prior art, and therefore, the detector means need not be of such a high mechanical accuracy as has heretofore been required, and the detector means 3 may be small and disposed in direct association with the reel spindle, which means a small space occupied by the detector means and freedom of the detector means from spatial limitations.

While the present invention has been described with respect to one specific embodiment thereof, it is to be understood that the foregoing description is only exemplary of the invention and various modifications and changes may be made therein within the spirit and scope of the invention as defined in the appended claims.

What is claimed is:

1. An apparatus for imparting a predetermined tension to a tape transported at a predetermined velocity from one to the other of reels mounted on a pair of reel spindles at least one of which is rotated by a motor to have a rotational torque imparted thereto, said apparatus comprising: means for detecting the number of revolutions of the reel spindle rotated by the motor, means for a frequency-voltage converting a signal resulting from the detection and operatively connected to said detecting means, means operatively connected to said connecting means for converting into a logarithmic signal the signal resulting from said frequency-voltage conversion, means connected to said last mentioned converting means for subtracting said logarithmic signal from a predetermined reference voltage, and means for driving said motor by a signal resulting from the subtraction, thereby imparting a predetermined tension to the tape.

2. An apparatus according to claim 1, wherein said detecting means is associated with said reel spindle so as to provide a frequency signal corresponding to the number of revolutions thereof, said frequency-voltage converting means is adapted to convert said frequency signal into a DC voltage having a level proportional to the frequency of said frequency signal, said converting means includes means for logarithmically amplifying and processing said DC voltage so that there is provided a signal corresponding to the difference between said reference voltage and the logarithmically amplified DC voltage, and said motor is provided with the last-mentioned signal.

3. An apparatus according to claim 2, wherein said detecting means is provided in direct association with said reel spindle.

* * * * *